(12) United States Patent  
Takahashi et al.

(10) Patent No.: US 7,813,975 B2  
(45) Date of Patent: Oct. 12, 2010

(54) SYSTEM AND METHOD FOR PROCESSING ACCOUNT DATA

(75) Inventors: Norio Takahashi, Yokohama (JP); Toshiyuki Yamagishi, Tokyo (JP); Taiki Sakata, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1433 days.

(21) Appl. No.: 10/752,990

(22) Filed: Jan. 8, 2004

(65) Prior Publication Data

US 2005/0021427 A1 Jan. 27, 2005

(30) Foreign Application Priority Data

Jul. 22, 2003 (JP) ............... 2003-199583

(51) Int. Cl.
    G07B 17/00 (2006.01)
(52) U.S. Cl. ............... 705/30; 705/32; 705/51; 705/35; 705/1; 706/45
(58) Field of Classification Search ............ 705/30, 705/32, 51, 35, 1; 706/45
    See application file for complete search history.

(56) References Cited

U.S. PATENT DOCUMENTS

| | | | |
|---|---|---|---|
| 5,212,639 A * | 5/1993 | Sampson et al. ............ | 705/30 |
| 5,940,809 A * | 8/1999 | Musmanno et al. ......... | 705/35 |
| 2002/0019812 A1* | 2/2002 | Board et al. ................ | 705/51 |
| 2003/0004864 A1* | 1/2003 | Kregor et al. .............. | 705/38 |
| 2003/0227392 A1* | 12/2003 | Ebert et al. ............. | 340/825.49 |
| 2005/0010524 A1* | 1/2005 | Gutbrod et al. ............ | 705/40 |
| 2005/0182700 A1* | 8/2005 | Suh ............................. | 705/32 |

FOREIGN PATENT DOCUMENTS

| JP | 11039409 A | * | 2/1999 |
|---|---|---|---|
| JP | 2000-099576 | | 4/2000 |
| JP | 2002-259654 | | 9/2002 |

OTHER PUBLICATIONS

Fumiko Ishii (phonetic) et al., "Latest business software strongly assisting business improvement" in "OA Bijinesu Pasokon", Denpa-Shinbun-sha, Oct. 1, 1998, vol. 16, No. 10, pp. 18-20.

Junko Tomonoh, "System solution for speeding up consolidated settlement . . . ", in "ProVISION", IBM Japan, Ltd., Apr. 22, 2003, vol. 10, No. 2, pp. 48-57.

"Providing for 'Year 2004 Problem', Group Accounting Data Warehouse", in Gekkan Solution IT, Kabushiki Kaisha Rick Telecom (phonetic), Mar. 1, 2003, vol. 15, No. 3, pp. 23-28.

* cited by examiner

*Primary Examiner*—Vanel Frenel  
(74) *Attorney, Agent, or Firm*—Antonelli, Terry, Stout & Kraus, LLP.

(57) ABSTRACT

When inconsistency occurs between data presented from individual group enterprises, causes of the inconsistency cannot be specified easily in a conventional consolidated settlement processing method. In the embodiments of the invention, an XBRL conversion module converts inputted account data into data resulting from synthesis of standard data and extended data by using a mapping table and transmits the converted data to a data separation module. The data separation module separates the standard data and extended data of the received data and stores these types of data in corresponding storage tables while adding them with information for mutual relevancy. In this manner, when inconsistency occurs during a consolidated settlement process, causes of the inconsistency can be specified easily by acquiring the extended data.

7 Claims, 17 Drawing Sheets

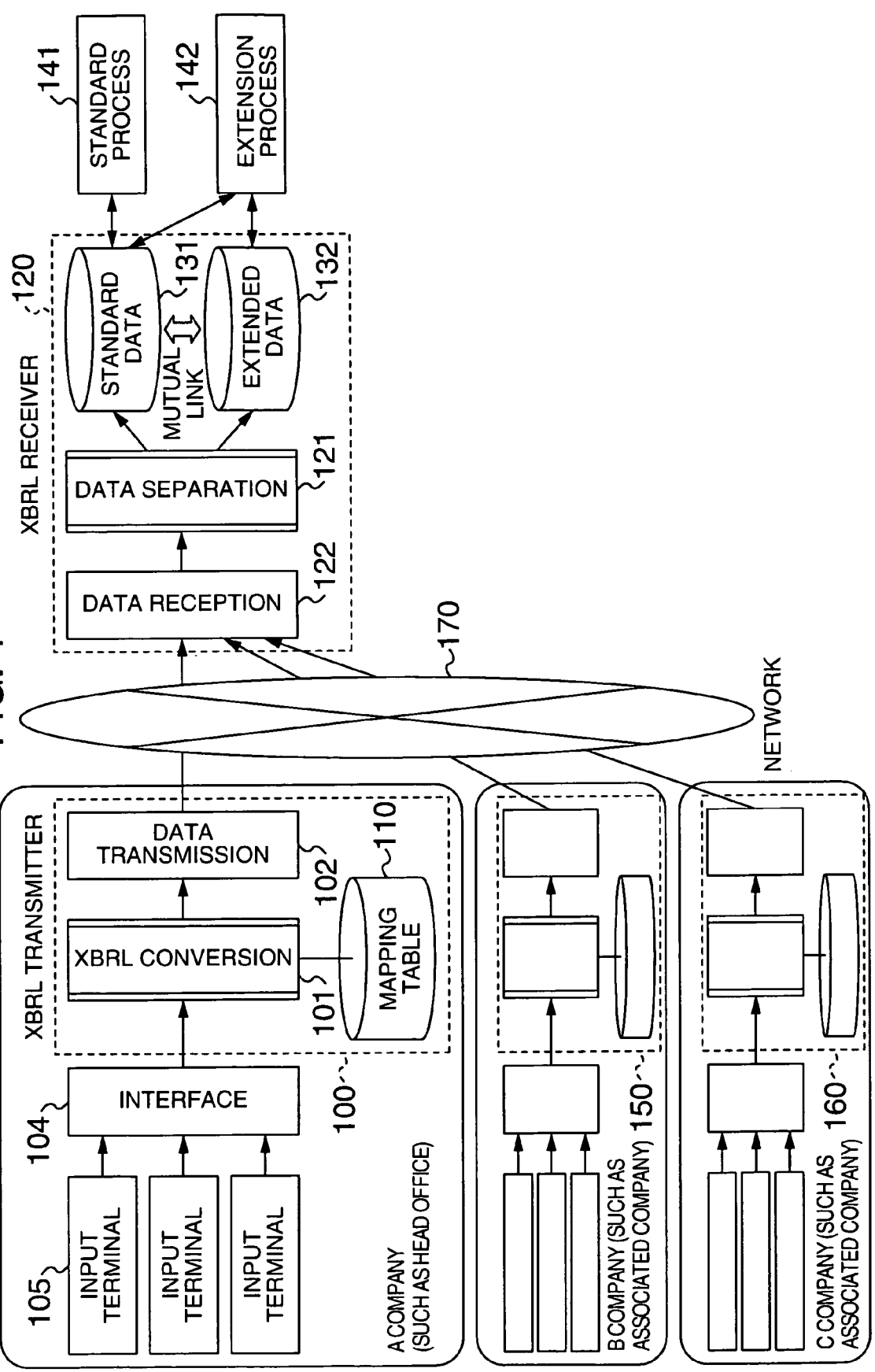

FIG. 2

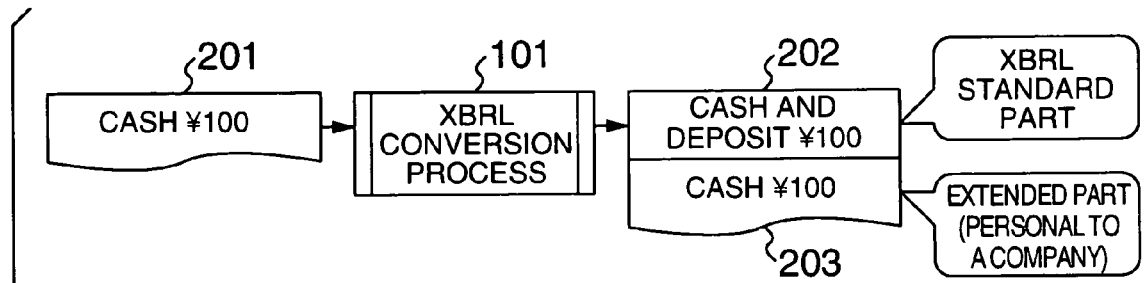

SLIP DATA

```
<SLIP>
  <SLIP NUMBER>12345</SLIP NUMBER>
  <ACCOUNT TITLE NAME>CASH</ACCOUNT TITLE NAME>
  <MONEY AMOUNT>100</MONEY AMOUNT>
</SLIP>
```
~210

JORNALIZING DATA

```
<STANDARD:SLIP>
  <STANDARD:SLIP NUMBER>12345</STANDARD:SLIP NUMBER>
  <STANDARD:ACCOUNT TITLE NAME>CASH AND DEPOSIT</STANDARD:ACCOUNT TITLE NAME>
  <STANDARD:MONEY AMOUNT>100</STANDARD:MONEY AMOUNT>
  <A COMPANY:ACCOUNT TITLE NAME>CASH</A COMPANY:ACCOUNT TITLE NAME>  ~212
</STANDARD:SLIP>
```
~211

A COMPANY MAPPING TABLE

| STANDARD ACCOUNT TITLE (221) | A COMPANY ACCOUNT TITLE (222) |
|---|---|
| CASH AND DEPOSIT | CASH |
| BILL RECEIVABLE AND ACCOUNTS RECEIVABLE | PRODUCT ACCOUNTS DUE |
| ⋮ | ⋮ |

~220

SYSTEM AND METHOD FOR PROCESSING ACCOUNT DATA

BACKGROUND OF THE INVENTION

The present invention relates to a processing method in an account data processing system.

Conventionally, the account process in an enterprise has typically been prosecuted in a unit of unitary business affairs such as a payment process and a sales management process. For this reason, when these processes are automated through the use of a computer, a system is structured process by process and each process unit is conducted in a data format defined individually or personally. When systems are connected together and data are cooperated for the purpose of cooperating the processes, it is necessary that conversion to a data format of a connection target system be done or a system receiving data convert the data into a data format of its own system.

Further, with a demand for audit increasing, such a situation as above can hardly be dealt with through the conventionally practiced business affairs process on the paper base and manual-handling base. Especially, activity to stipulate a data format for uniformly handling account data in the worldwide scale has been activated and an XBRL (extensible Business Reporting Language) extending the XML has been planned/settled and started to be used. The XBRL defines titles of account prescribed pursuant to world account standards as an XML tag set and deals with account standards of each country by extending the tag set. Structuring of a distribution system for settlement short-term credit data of securities exchange or development of a tax information electronic application system has been effected using the XBRL.

In addition, as a process characteristic of enterprise account, a consolidated accounting or settlement process is available. An associated company holding issued stocks at a constant rate or more is considered as a subsidiary company and is a target of consolidated settlement, so that an enterprise is required to publicize not only account settlement information of the enterprise alone but also account settlement information of a whole of group including the consolidated subsidiary company. In this case, the settlement information is calculated by canceling out profit and loss incurred in transactions between group enterprises. For example, JP-A-11-039409 discloses a method, according to which account settlement information calculated by individual group enterprises and electronic data of transactions information are held to calculate consolidated settlement information.

SUMMARY OF THE INVENTION

The consolidated settlement process is carried out using the aforementioned conventional techniques. But in the conventional techniques, when inconsistency is incurred between data presented by individual group enterprises and correct settlement data cannot be prepared, there arises a problem that causes of the inconsistency must be searched manually.

It is an object of the present invention to detect inconsistency in data in a settlement calculation process and display detailed slip data indicative of causes of the inconsistency to thereby specify the causes easily.

To accomplish the above object, according to the invention, in an account data processing method using a computer, account data is received from another computer, the received account data is separated into standard account data and extended account data on the basis of predetermined conditions, the same data identifier is assigned to the standard account data and the extended account data, and the standard account data and extended account data are stored in a standard data storage table and an extended data storage table, respectively, by making correspondence relationships between these types of account data.

In an account data processing method according to the invention, an input terminal transfers received account data to a data process interface, the interface transfers the data to a data transmitter, the data transmitter transmits the data to a data receiver through a network, the data receiver receives the data to perform a business affairs process, wherein the data transmitter has data conversion means and a mapping table, and the data conversion means has procedures for acquiring, from the mapping table, standard account data made to correspond to system inherent account data included in the account data to convert the inherent account data in the account data into the standard account data and adding the inherent account data to the account data, and wherein the data receiver has data separation means, a standard data storage table and an extended data storage table, and the data separation means has procedures for separating the received account data into standard account data and extended account data and storing the standard account data and extended account data in the standard and extended data storage tables, respectively, by adding the same identifier to the respective account data to make the correspondence relationships therebetween.

Further, an account data processing method according to the invention has data totaling means, financial data preparing means, financial data displaying means, consolidated settlement consistency verifying means, financial data comparing means, inconsistent data displaying means, standard account data defining data and a verification item correspondence list, wherein the data totaling means has procedures for acquiring a plurality of pieces of standard account data having the same account title name from a standard data storage table and synthesizing the acquired account data pieces to total data, wherein the financial data preparing means has a procedure for preparing financial data from the total data in accordance with the standard account data defining data, wherein the financial data displaying means has a procedure for displaying the financial data, wherein the consolidated settlement consistency verifying means has procedures for acquiring, from the verification item correspondence list, a collation target item relevant to a collation source account title contained in the financial data, acquiring a value of the collation target item contained in verification object financial data of the financial date, comparing a value of the collation source account title with the value of the collation target item and calling the financial data comparing means when non-coincidence occurs, wherein the financial data comparing means has procedures for acquiring, from the total data storage table, total data corresponding to the collation source account title and total data corresponding to the collation target account title, comparing corresponding standard account data contained in the respective total data and calling the inconsistent data displaying means when non-coincidence occurs, and wherein the inconsistent data displaying means has a procedure for acquiring respective extended account data corresponding to the standard account data from the extended data storage table and displaying the acquired data.

Other objects, features and advantages of the invention will become apparent from the following description of the embodiments of the invention taken in conjunction with the accompanying drawings.

BRIEF DESCRIPTION OF THE DRAWINGS

FIG. 1 is a diagram showing the construction of an account data conversion, transmission and reception process system in a first embodiment.

FIG. 2 is a diagram showing a data structure in an account data conversion process in the first embodiment.

DESCRIPTION OF THE EMBODIMENTS

Figure 3:
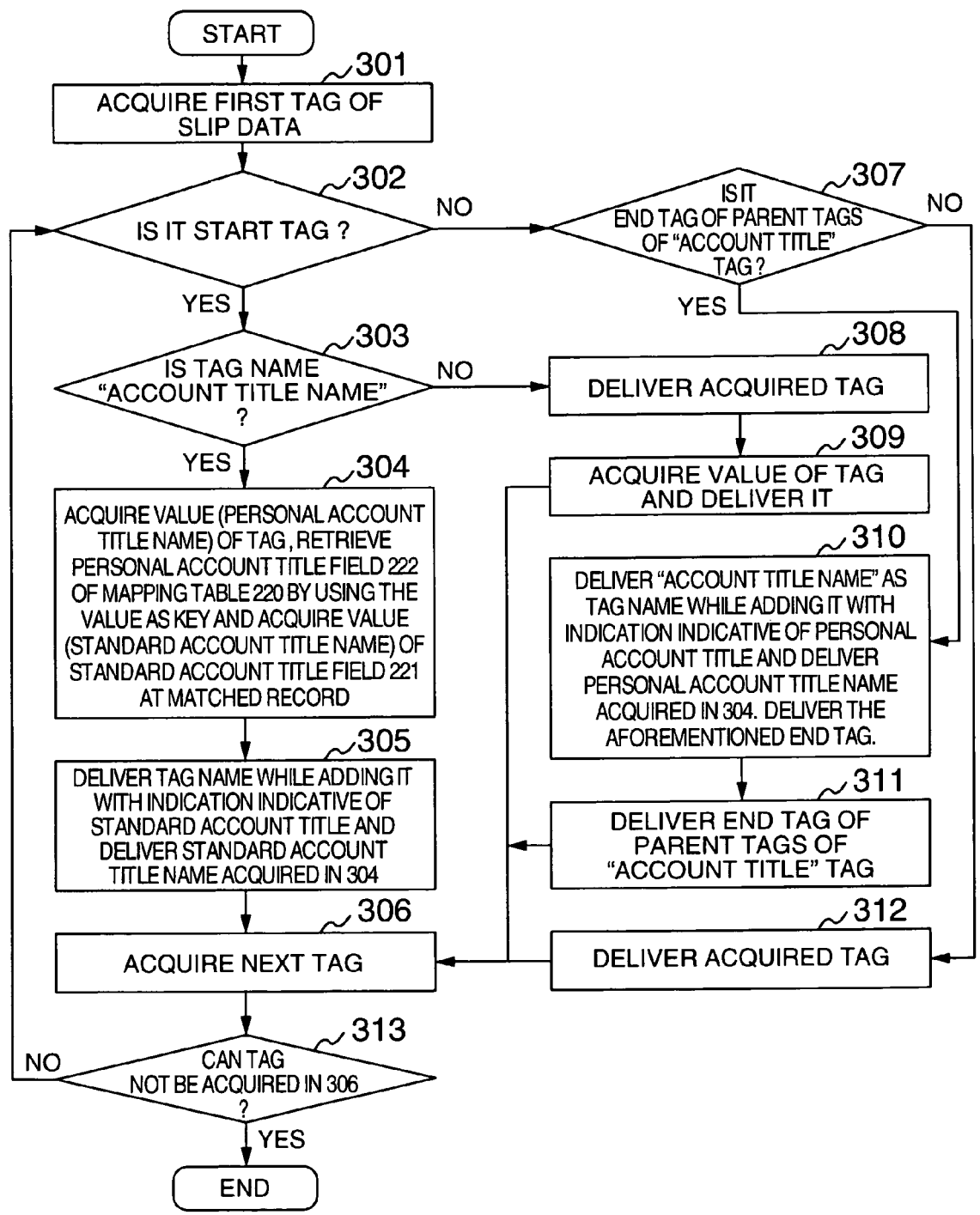
FIG. 3 is a detailed flowchart of the data conversion process in the first embodiment.

Embodiments of the present invention will now be described in greater detail with reference to the accompanying drawings.

A method for processing account data and a method for transmitting/receiving the data will be described in a first embodiment.

Referring to FIG. 1, there is illustrated, in block diagram form, the construction of an accounting data conversion and transmission/reception processing system. An XBRL transmitter 100 has an XBRL conversion module 101, a data transmission module 102 and a mapping table 110. The XBRL transmitter 100 is connected to input terminals 105 through the medium of an interface module 104. An XBRL receiver 120 has a data separation module 121, a data reception module 122, a standard data storage table 131 and an extended data storage table 132. Standard process module 141 and extension process module 142 may be implemented either on a computer connected with a storage unit in which the standard data storage table 131 and extended data storage table 132 are stored or in another way.

It will be appreciated that various tables as above may be stored in a memory unit, for instance. Further, the various modules may be packaged in the form of, for example, programs. In addition, transmitters, receivers and various terminals may be implemented with computers or portable terminals or with other devices.

The XBRL transmitter 100 and the XBRL receiver 120 are connected to each other through a network 170. XBRL transmitters 150 and 160 equivalent to the XBRL transmitter 100 and existent on the system are also connected to the XBRL receiver 120 via the network 170. As an example, the system in which connection is routed through the network is depicted herein but a system may be employed in which data is transmitted/received by radio, for instance, without using the network. The computers constituting the system have each the function such as an operating system necessary for managing data, files and memory units.

When a user of the system inputs account data to an input terminal 105, the input terminal 105 transfers the data to the interface 104. Then, the interface 104 takes over the data to the XBRL conversion module 101. The XBRL conversion module 101 converts the received data by using the mapping table 110 and transfers resulting data to the data transmission module 102. The data transmission module 102 transmits the converted data to the data reception module 122 through the network 170.

The data reception module 122 transfers the received data to the data separation module 121. The data separation module 121 separates the received data into standard data and extended data, adds, to the standard data and extended data, information for mutually associating them and stores the respective data in the standard data storage table 131 and extended data storage table 132.

Turning to FIG. 2, a data structure in an account data conversion process is diagrammatically illustrated. The XBRL conversion process module 101 receives, as input data, account data 201 having a system inherent data format, converts it into account data resulting from synthesis of data 202 in a format pursuant to a format prescribed by XBRL specifications and extended data part 203 and delivers the converted account data. An example of a detailed data structure of the system inherent account data 201 is shown at slip data 210. The slip data 210 is described in the XML format, including a number indicative of an identifier of the account data, an account title name and money amount data. An example of a detailed data structure of the data after conversion is shown at journalizing data 211.

In the converted data, name spatial indications indicative of standards are added to XML tags indicative of respective data so that the account title name pursuant to the XBRL standard format may be converted and besides, data 212 before conversion is included in which name spatial indications indicative of the inherent format are added to the tags. A data structure of the mapping table 110 is shown at table 220. The mapping table 220 has a standard account title column 221 and an inherent account title column 222 and in the standard account title column 221, titles of account determined by the XBRL specifications are stored at respective rows whereas in the inherent account title column 222, corresponding inherent titles of account are stored.

Referring to FIG. 3, there is illustrated an example of a detailed process flow in the data conversion process module. The XBRL conversion module 101 carries out a process covering steps 301 through 313. In step 301, a first tag of slip data is acquired. In step 302, it is decided whether the tag is a start tag and if so, step 303 is executed but if not so, step 307 is executed. In the step 303, it is decided whether the tag name is an "account title" and if so, step 304 is executed but if not so, step 308 is executed.

In the step 304, a value (personal account title name) of the tag is acquired and the personal or inherent account title field 222 of mapping table 220 is retrieved by using the value as key to acquire a value (standard account title name) of the standard account title field 221 at a coincident or matched record. In step 305, the tag name is added with an indication indicative of the standard account title and delivered so that the standard account title name acquired in the step 304 may be delivered. In step 306, the next tag is acquired. In step 313, it is decided whether the tag cannot be acquired in the step 306 and if so, the process ends but if not so, the step 302 is executed.

In the step 307, it is decided whether the first tag is an end tag of parent tags of "account title" and if so, step 310 is executed but if not so, step 312 is executed. In the step 308, the acquired tag is delivered. In step 309, a value of the tag is acquired and delivered. In the step 310, "account title name" is added with an indication indicative of the personal account title and delivered as a tag name so that the personal account title name acquired in the step 304 may be delivered. In this step, the aforementioned end tag is delivered. In step 311, the end tag of parent tags of "account title" tag is delivered. In the step 312, the acquired tag is delivered.

Figure 4:
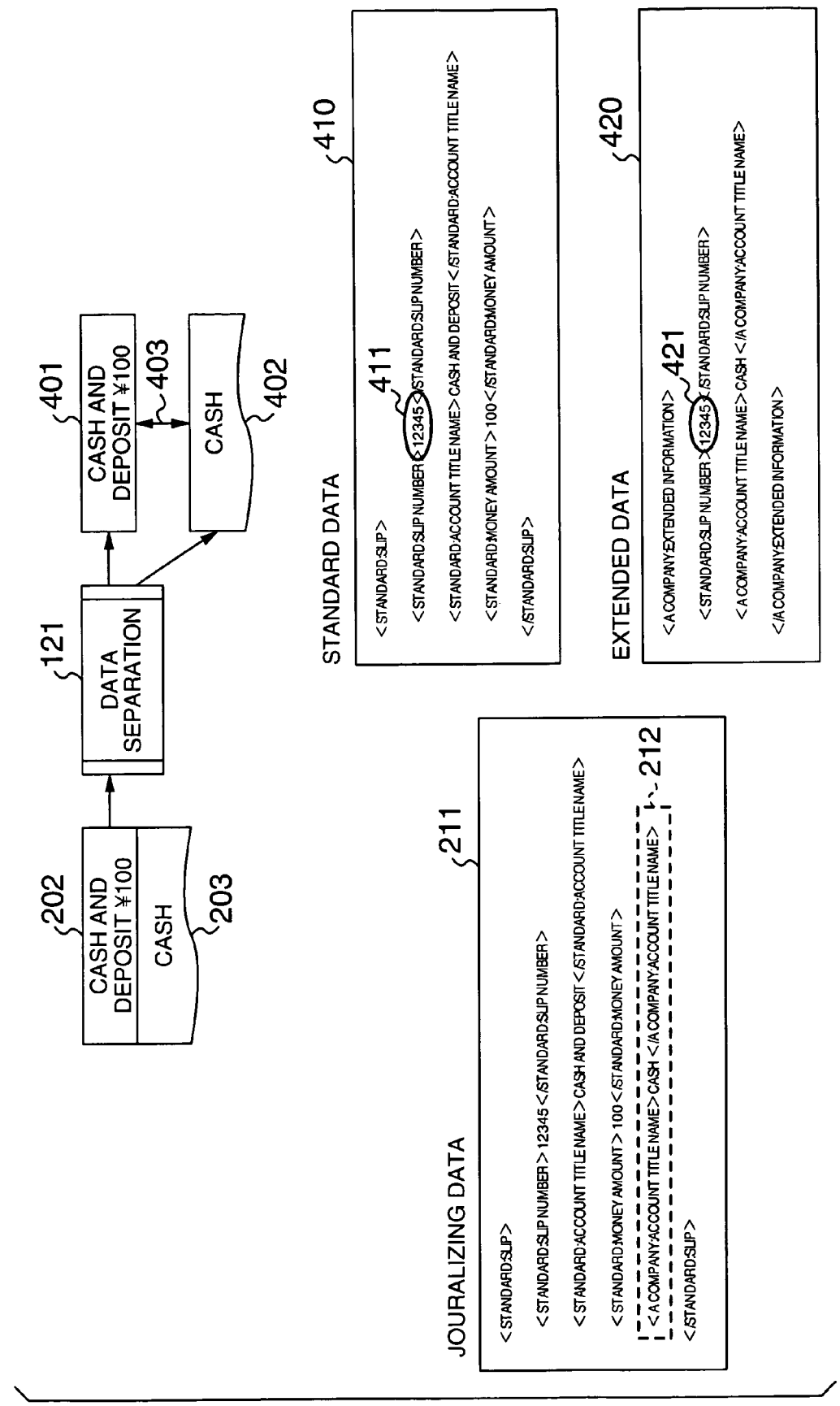
FIG. 4 is a diagram showing a data structure in an account data separation process in the first embodiment.

Turning to FIG. 4, there is illustrated a data structure in the account data separation process. The data separation module 121 receiving data separates it into standard data 401 described in the XBRL standard data format and extended data 402 described in the inherent format and stores the separated data after adding them with relevancy 403. A detailed example of the standard data 401 is indicated at standard data 410. The standard data has data extracted from journalizing data 211 and having name spatial indications indicative of standards and data 411 having relevancy to extended data. A detailed example of extended data 402 is shown at extended data 420. The extended data has data 212 before conversion extracted from the journalizing data 211 and relevant data 421.

While in FIG. 4, relevant data 411 and relevant data 421 are exemplarily indicated by a numeral "12345" sandwiched between tags termed "standard:slip number", other means may be used. In the process for separating the data, data separation may be effected on the basis of predetermined conditions so that the data can be separated into extended data and standard data.

Figure 5:
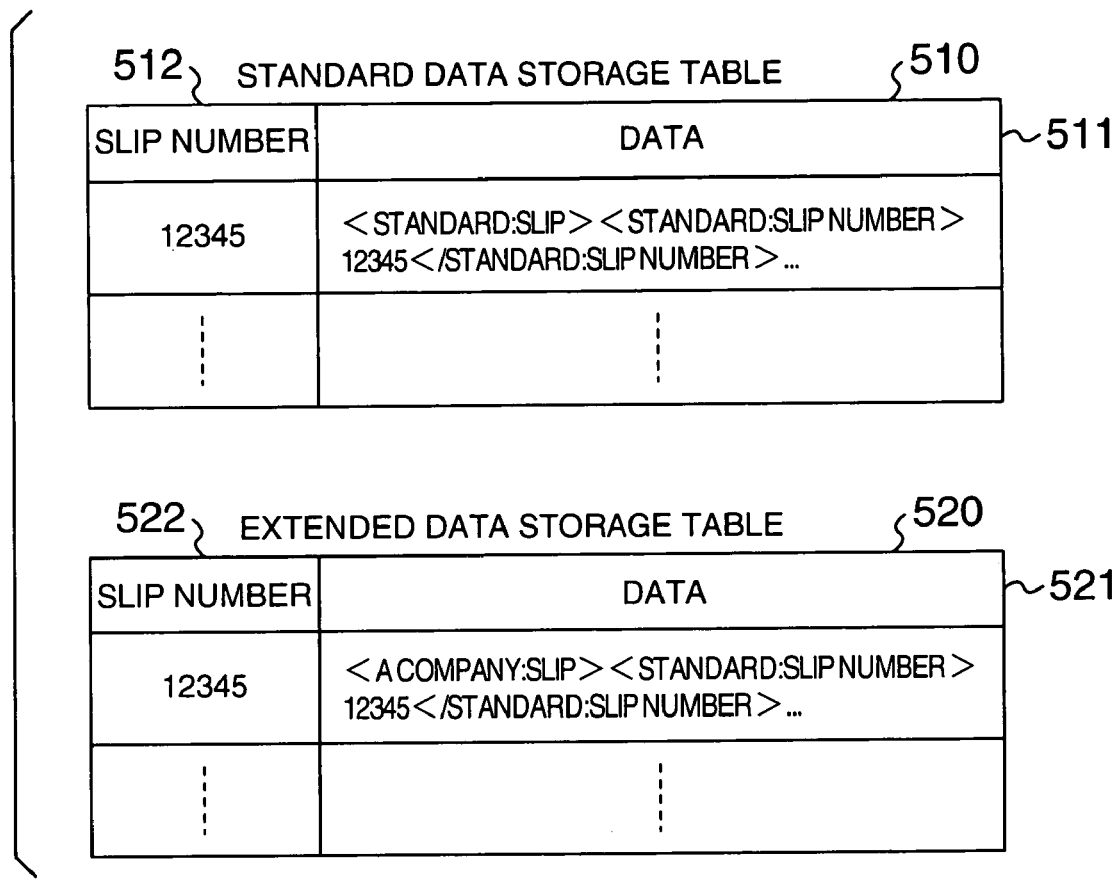
FIG. 5 is a diagram showing a data structure in a data storage table in the first embodiment.

Turning to FIG. 5, there is illustrated a data structure of the data storage table. A standard data storage table 510 has a relevant information (slip number) column 512 and a data storage column 511. In the data storage column 511, standard data is stored in respective rows and in the relevant information column 512, relevant data in the corresponding data is stored. An extended data storage table 520 has relevant information (slip number) column 522 and data storage column 521. In the data storage column 521, extended data is stored in respective rows and in the relevant information column 522, relevant data in the corresponding data is stored.

Figure 6:
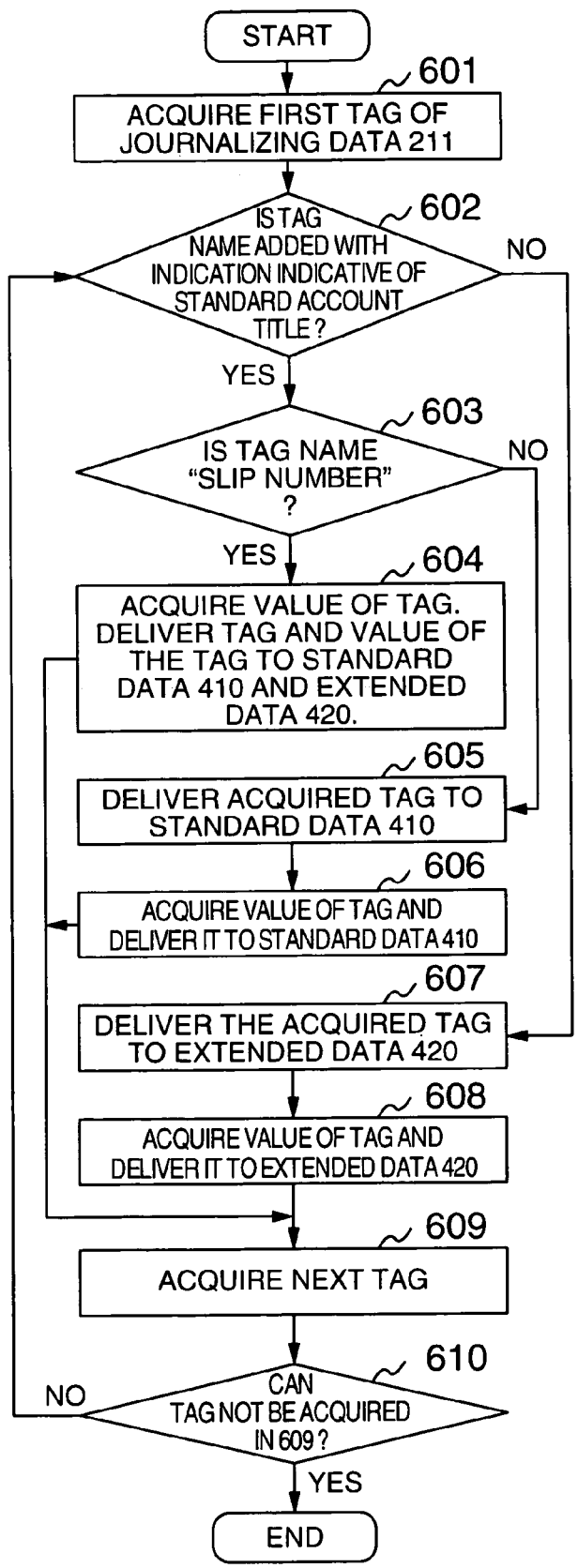
FIG. 6 is a detailed process flowchart in a data separation module in the first embodiment.

Referring now to FIG. 6, there is illustrated an example of a detailed process flow in the data separation module 121. The data separation module 121 carries out a process covering steps 601 through 610.

In step 601, a first tag of journalizing data 211 is acquired. In step 602, it is decided whether the tag name is added with an indication indicative of a standard account title and if so, step 603 is executed but if not so, step 607 is executed. In the step 603, it is decided whether the tag name is a "slip number" and if so, step 604 is executed but if not so, step 605 is executed. (It is to be noted that in this example, data of the tag name called "slip number" is relevant data assigned to each of the standard data and extended data but other data may be used. In addition, it may be determined in advance what kind of tags is used as the tags for relevant data.)

In the step 604, a value of the tag is acquired and the tag and the tag value are delivered to the standard data 410 and extended data 420. In the step 605, the acquired tag is delivered to the standard data 410. In step 606, a value of the tag is acquired and the tag value is delivered to the standard data 410. In the step 607, the acquired tag is delivered to the extended data 420.

In step 608, a value of the tag is acquired and is delivered to the extended data. In step 609, the next tag is acquired. In step 610, it is decided whether the tag cannot be acquired in the step 609 and if so, the process is ended but it not so, the execution of the step 602 follows.

By carrying out the above process, the extended data relevant to the standard data representing a settlement process object can be acquired easily when a consolidated settlement process is prosecuted in the system having the XBRL receiver 120.

A method of searching causes of inconsistency during consolidated account calculation will be described in a second embodiment.

Figure 7:
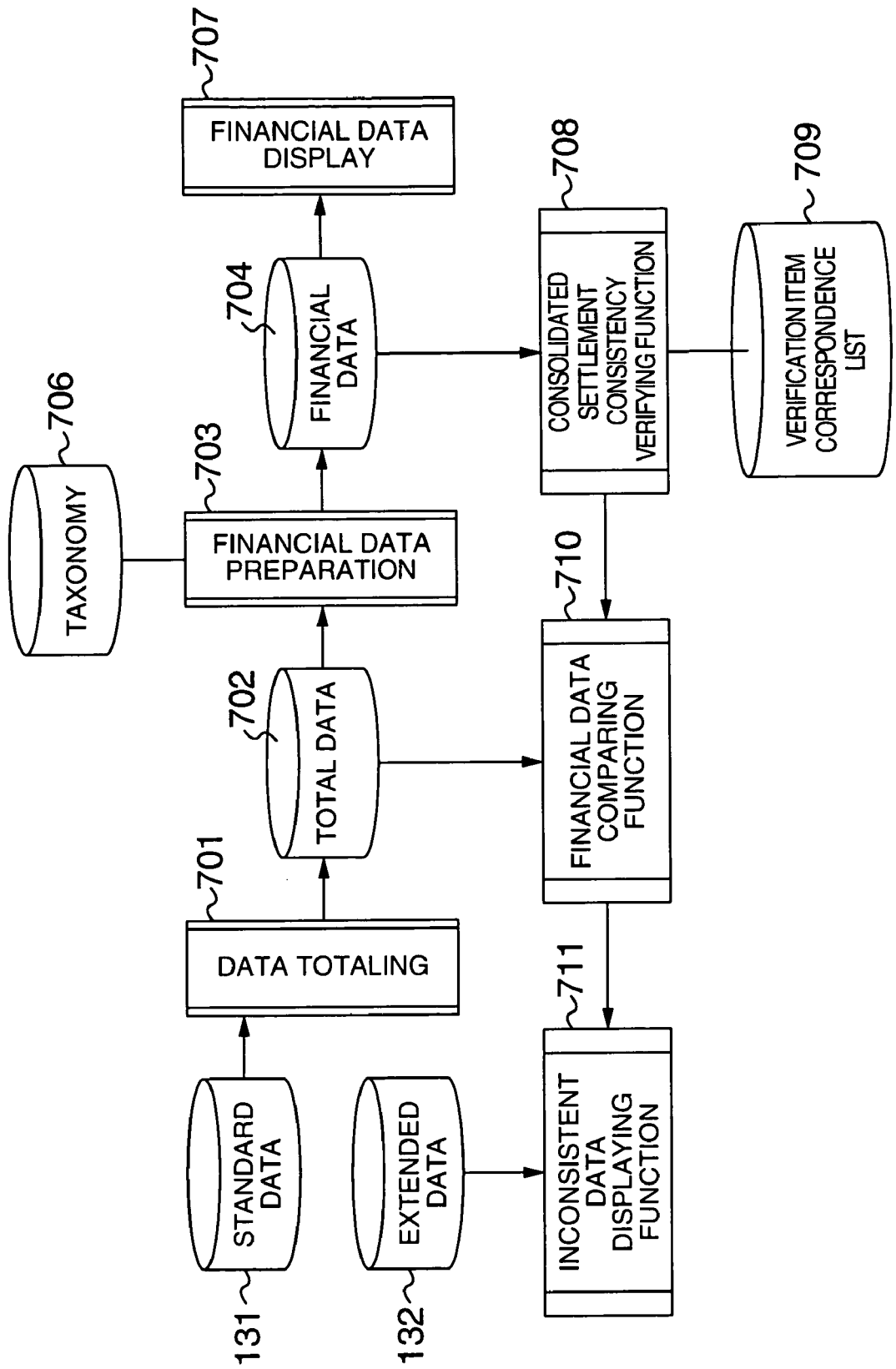
FIG. 7 is a diagram showing the construction of a consolidated settlement calculation system to which a second embodiment is applied.

Referring to FIG. 7, there is illustrated the construction of a consolidated settlement calculation system. The present system has a data totaling module 701, a financial data preparing module 703, a financial data displaying module 707, a consolidated settlement consistency verifying module 708, a financial data comparing module 710, an inconsistent data displaying module 711, a total data table 702, a financial data table 704, a taxonomy 706 and a verification item correspondence list 709. The list, table, taxonomy and so on may be stored in a memory included in a computer in which the various modules are executed or may be stored in a storage device accessible by the computer or in a different way.

The data totaling module 701 acquires, from the standard data table 131, a plurality of pieces of standard data having the same account title name, prepares total data by synthesizing them and stores the total data in the total data table 702. The financial data preparing module 703 acquires the plurality of pieces of total data from the total data table 702 in connection with titles of account described in the taxonomy 706 and prepares financial data which in turn is stored in the financial data table 704. The financial data module 707 acquires the financial data from the financial data table 704 in accordance with a request by the user and displays the acquired data.

The consolidated settlement consistency verifying module 708 acquires the financial data from the financial data table 704 and verifies it in paired collation source item (title of account) and collation target item (title of account) which are stored in the verification item correspondence list 709 and in case inconsistency occurs, it calls the financial data comparing module 710. The financial data comparing module 710 acquires, from the total data table 702, total data behaving as a calculation source of the item responsible for the inconsistency and performs verification.

When standard data causing the inconsistency is detected, the data is taken over to the inconsistent data displaying module 711. The inconsistent data displaying module 711 acquires extended data corresponding to the transferred standard data and displays it on the screen.

Figure 8:
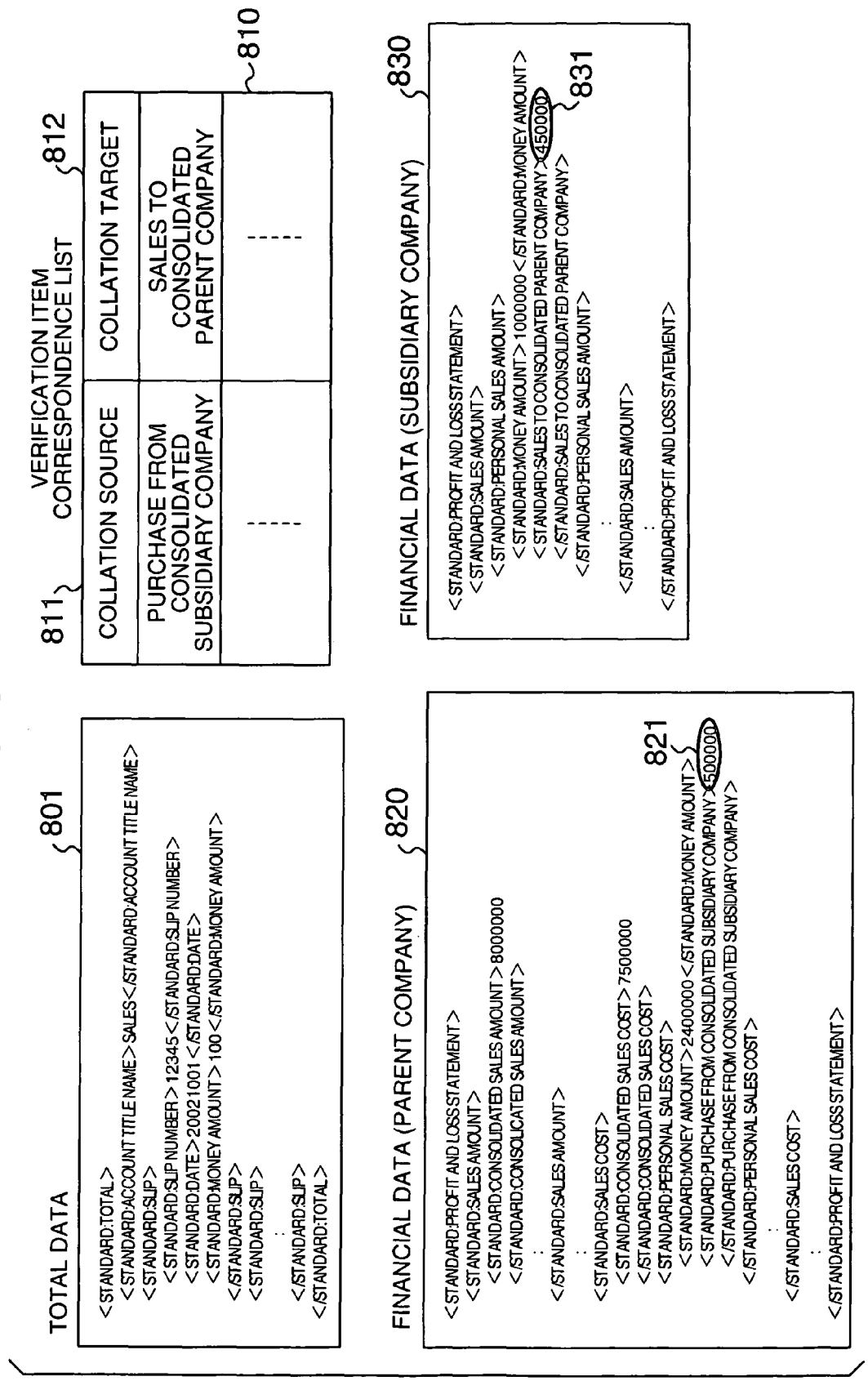
FIG. 8 is a diagram showing a data structure in a consolidated settlement processing method in the second embodiment.

Turning to FIG. 8, there is illustrated a principal data structure used in the consolidated settlement process method. In total data 801, the account title name and standard data having the account title name are described repeatedly. A verification item correspondence list 810 has a collation source column 811 and a collation target column 812 and in the collation source column 811, one account title whose value should be coincident or matched when the consolidated settlement process is carried out is stored in respective rows and in the collation target column 812, the other item to be paired with the collation source item is stored.

Financial data (parent company) 820 indicates details of financial data. Included in the financial data are data 821 which should be coincident or matched in inter-group enterprise settlement data in addition to stated items ruled by law. Financial data (subsidiary company) 830 indicates details of financial data behaving as an object to be verified in relation to the financial data (parent company) 820. Similarly to the financial data (parent company) 820, the data 830 includes data 831 which should be coincident or matched in intergroup enterprise settlement data in addition to stated items ruled by law.

Figure 9:
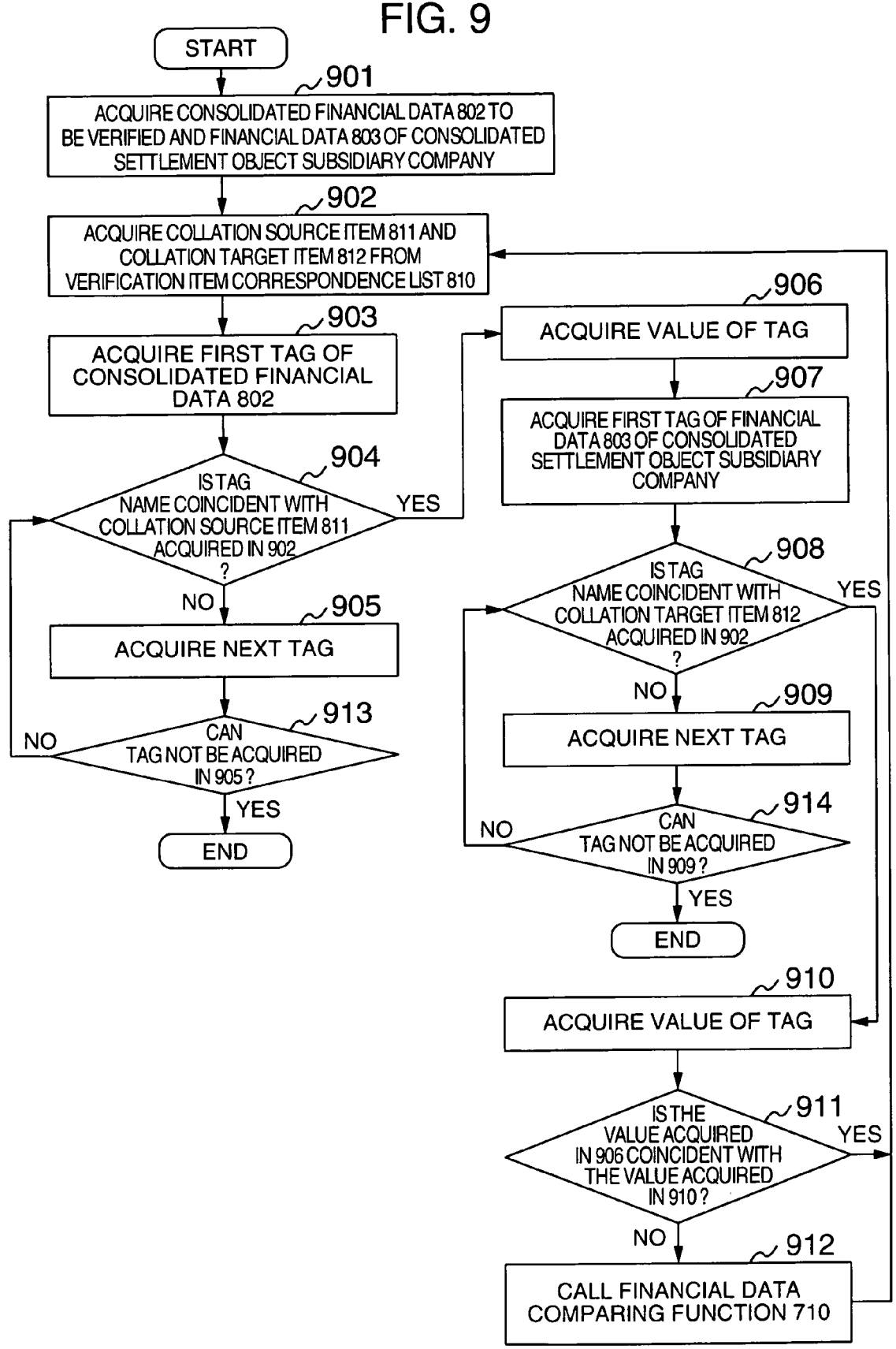
FIG. 9 is a detailed process flowchart of a consolidated settlement consistency verifying process in the second embodiment.

Referring now to FIG. 9, there is illustrated an example of a detailed process flow in the consolidated settlement consistency verifying module 708. The consolidated settlement consistency verifying module 708 carries out a process covering steps 901 through 914. In step 901, consolidated financial data 802 to be verified and financial data 803 of a consolidated settlement object subsidiary company are acquired. In step 902, a collation source item 811 and a collation target item 812 are acquired from the verification item correspondence list 810.

In step 903, a first tag of the consolidated financial data 802 is acquired. In step 904, it is decided whether the tag name is coincident with the collation source item 811 acquired in the step 902 and if so, step 906 is executed but if not so, the execution of step 905 follows.

In the step 905, the next tag is acquired. In step 913, it is decided whether the tag cannot be acquired in the step 905 and if so, the process is ended but if not so, the execution of the step 904 follows. In the step 906, a value of the tag is acquired. In step 907, a first tag of the financial data 803 of the consolidated settlement object subsidiary company is acquired.

In step 908, it is decided whether the tag name is coincident with the collation target item 812 acquired in the step 902 and if so, step 910 is executed but if not so, step 909 is executed. In the step 909, the next tag is acquired. In step 914, it is decided whether the tag cannot be acquired in the step 909 and if so, the process is ended but if not so, the execution of the step 908 follows.

In the step 910, a value of the tag is acquired. In step 911, it is decided whether the value acquired in the step 906 coincides with the value acquired in the step 910 and if so, the step 902 is executed but if not so, step 912 is executed. In the step 912, the financial data comparing function 710 is called.

Figure 10:
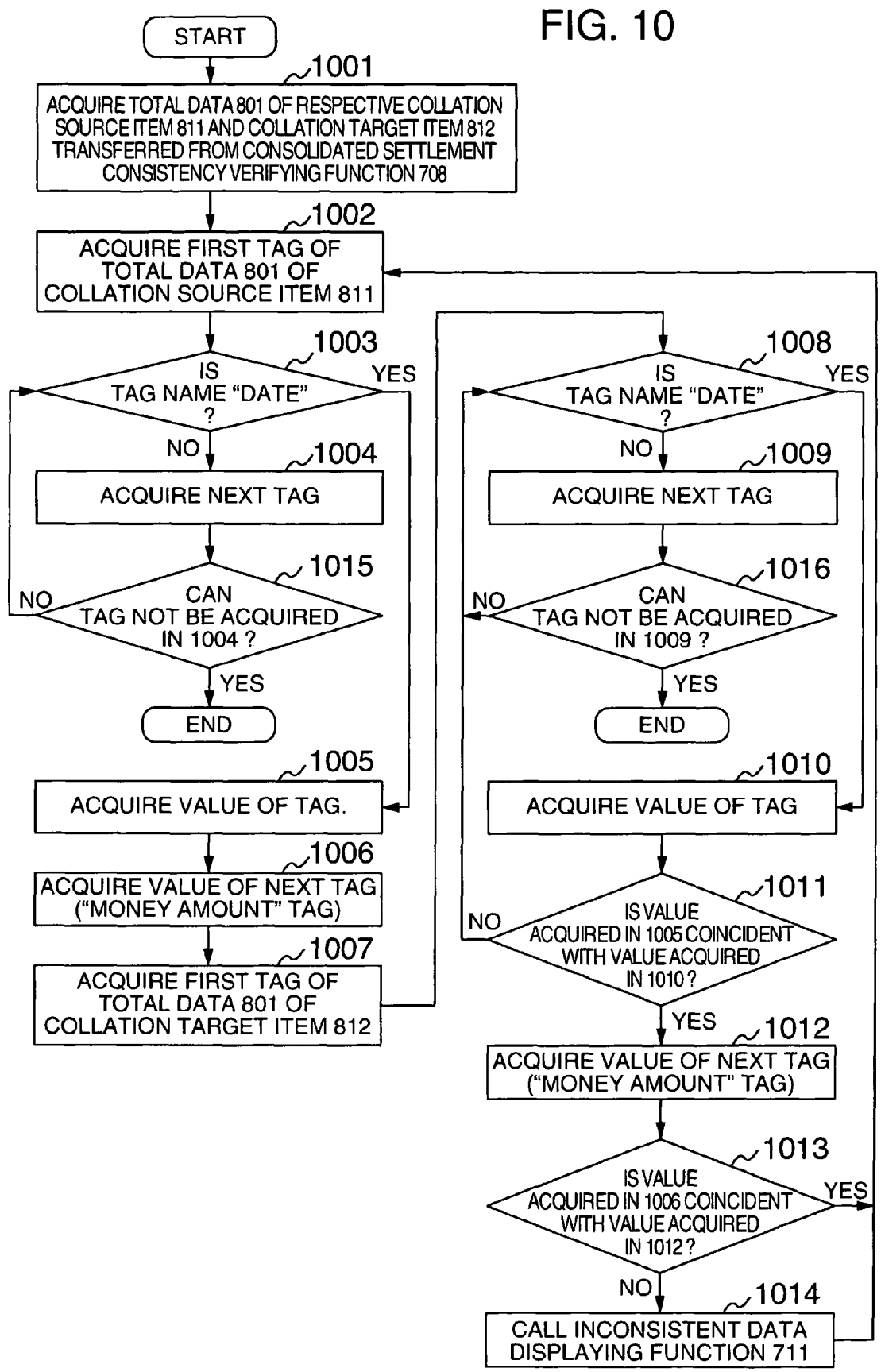
FIG. 10 is a detailed process flowchart in the financial data comparing function in the second embodiment.

Referring to FIG. 10, there is illustrated an example of a detailed process flow in the financial data comparing function 710. The financial data comparing function 710 carries out a process covering steps 1001 through 1016.

In step 1001, totaling data 801 of each of the collation source item 811 and collation target item 812 which are transferred from the consolidated settlement consistency verifying function 708 is acquired. In step 1002, a first tag of total data 801 of the collation source item 811 is acquired. In step 1003, it is decided whether the tag name is "date" and if so, step 1005 is executed but if not so, step 1004 is executed. In the step 1004, the next tag is acquired.

In step 1015, it is decided whether the tag cannot be acquired in the step 1004 and if so, the process is ended but if not so, the execution of the step 1003 follows. In the step 1005, a value of the tag is acquired. In step 1006, a value of the next tag ("money amount" tag) is acquired.

In step 1007, a first tag of total data 801 of the collation target item 812 is acquired. In step 1008, it is decided whether the tag name is "date" and if so, step 1010 is executed but if not so, step 1009 is executed. In the step 1009, the next tag is acquired. In step 1016, it is decided whether the tag cannot be acquired in the step 1009 and if so, the process is ended but if not so, the execution of the step 1008 follows. In the step 1010, a value of the tag is acquired.

In step 1011, it is decided whether the value acquired in the step 1005 coincides with the value acquired in the step 1010 and if so, step 1012 is executed but if not so, the execution of the step 1008 follows. In the step 1012, a value of the next tag ("money amount" tag) is acquired. In step 1013, it is decided whether the value acquired in the step 1006 coincides with the value acquired in the step 1012 and if so, the step 1002 is executed but if not so, step 1014 is executed. In the step 1014, the inconsistent data displaying function 711 is called.

Figure 11:
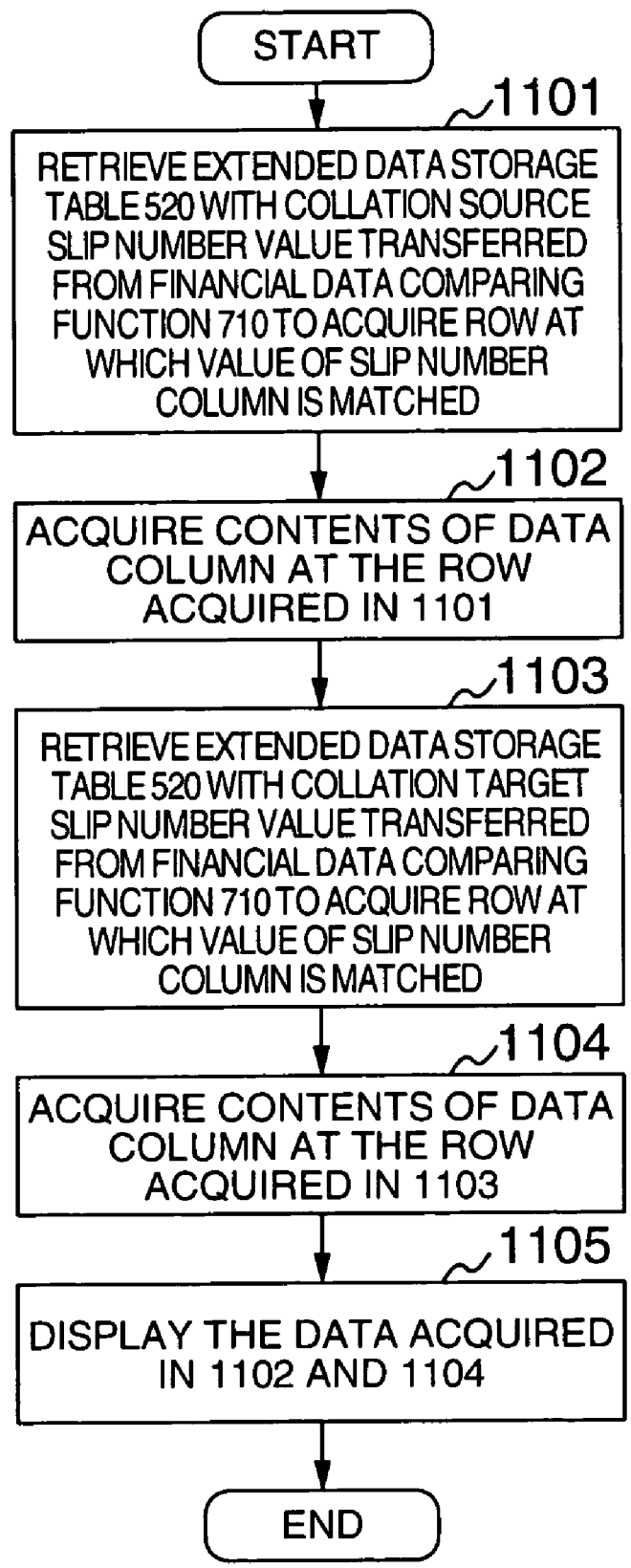
FIG. 11 is a detailed process flowchart in the inconsistent data display function in the second embodiment.

Referring to FIG. 11, there is illustrated an example of a detailed process flow in the inconsistent data displaying function 711. The inconsistent data displaying function 711 carries out a process covering steps 1101 through 1105. In step 1101, the extended data storage table 520 is retrieved by using a collation source slip number value transferred from the financial data comparing function 710 so as to acquire a row at which the value of slip number column is coincident or matched.

In step 1102, the contents of data column at the row acquired in the step 1101 is acquired. In step 1103, the extended data storage table 520 is retrieved by using a collation target slip number value transferred from the financial data comparing function 710 so as to acquire a row at which the value of slip number column is coincident or matched. In step 1104, the contents of data column at the row acquired in the step 1103 is acquired. In step 1105, data acquired in the steps 1102 and 1104 are displayed.

By carrying out the above process, inconsistency in data in the consolidated settlement calculation process for intergroup enterprises can be detected automatically and causes of the inconsistency can be specified easily by displaying detailed slip data responsible for the causes.

Another method for processing account data will be described in a third embodiment.

Figure 12:
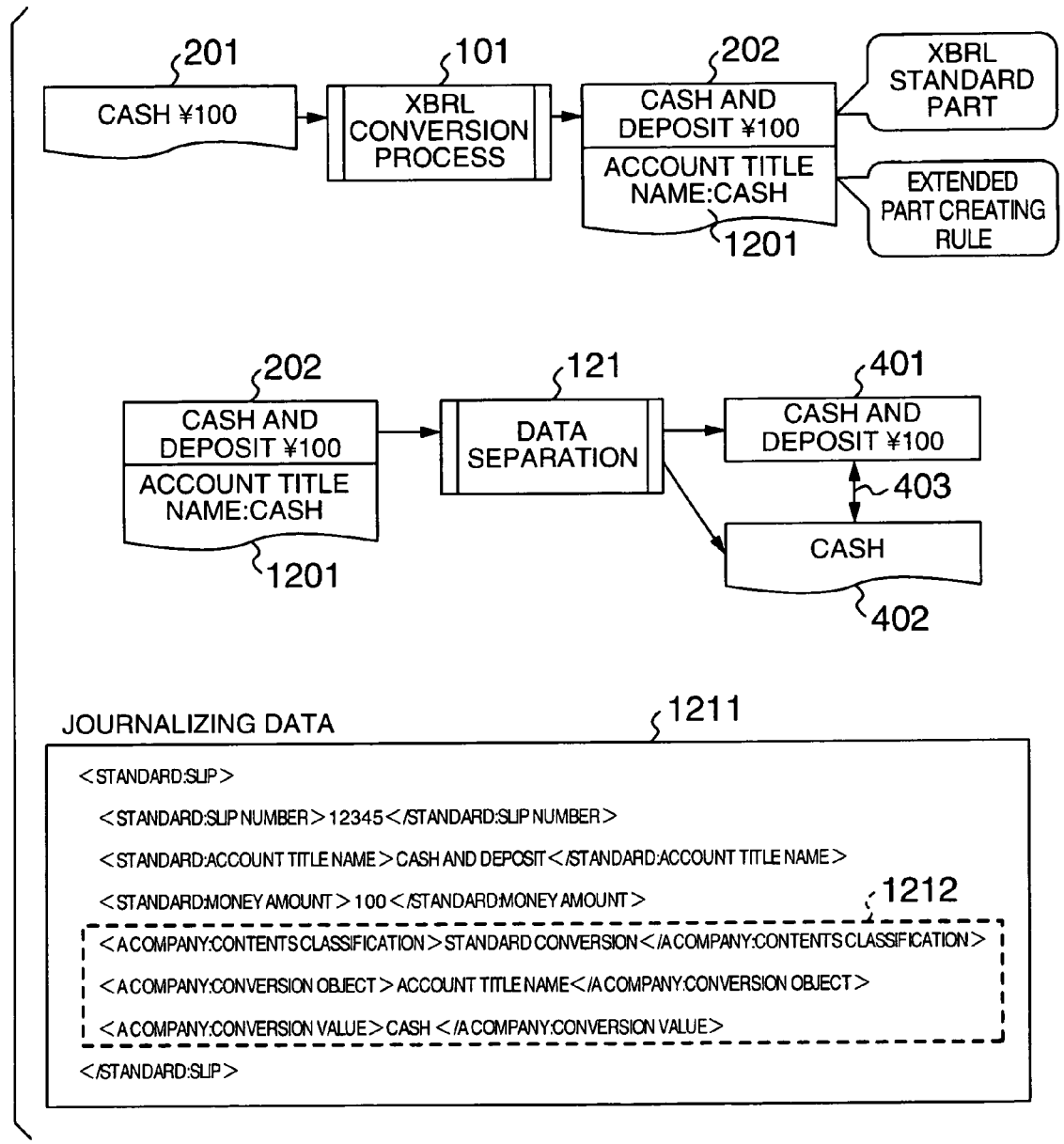
FIG. 12 is a diagram showing a data structure in an account data conversion process in a third embodiment.

Referring now to FIG. 12, there is illustrated a data structure in another conversion process of account data. The XBRL conversion process module 101 receives, as input data, account data 201 in system inherent data format, converts the received data into account data resulting from synthesis of data 202 in a format pursuant to the format prescribed by the XBRL specifications and rule information 1201 for preparation of extended data part and delivers the converted data.

An example of a detailed data structure of the data after conversion is shown at journalizing data 1211. The journalizing data has information 1212 for preparation of extended data in addition to standard data pursuant to the XBRL standard format. The information 1212 for preparation of extended data has an identifier indicative of a conversion method, conversion object item information and a value to be changed. The data separation module 121 receiving the data extracts standard data 401 described in the XBRL standard data format, prepares extended data 402 described in the inherent format by using rule information 1201 necessary for the preparation and stores the extended data while adding it with relevancy 403.

Figure 13:
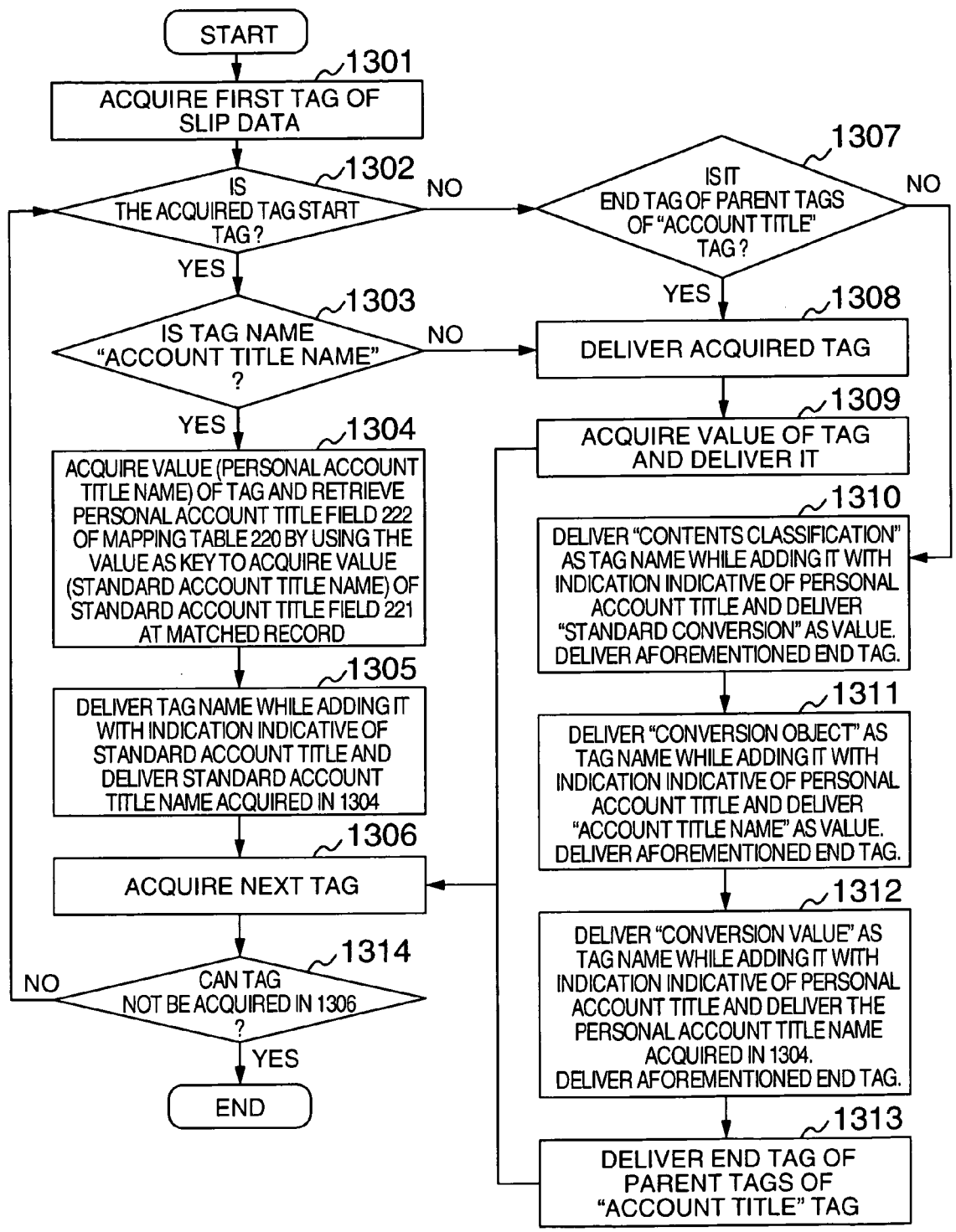
FIG. 13 is a detailed process flowchart of a data conversion process in the third embodiment.

Referring to FIG. 13, there is illustrated an example of a detailed process flow in the data conversion process module. The XBRL conversion module 101 carries out a process covering steps 1301 through 1314. In step 1301, a first tag of slip data is acquired. In step 1302, it is decided whether the tag is a start tag and if so, step 1303 is executed but if not so, step 1307 is executed.

In the step 1303, it is decided whether the tag name is "account title name" and if so, step 1304 is executed but if not so, step 1308 is executed. In the step 1304, a value (personal account title name) of the tag is acquired and the personal account title field 222 of the mapping table 220 is retrieved using the value as key so as to acquire a value (standard account title name) of standard account title field 221 at a coincident record.

In step 1305, the tag name is delivered while being added with an indication indicative of the standard account title and the standard account title name acquired in the step 1304 is delivered. In step 1306, the next tag is acquired. In step 1314, it is decided whether the tag cannot be acquired in the step 1306 and if so, the process is ended but if not so, the execution of the step 1302 follows.

In the step 1307, it is decided whether the acquired tag is an end tag of parent tags of "accounting title" tag and if so, the execution of the step 1308 follows but if not so, step 1310 is executed. In the step 1308, the acquired tag is delivered. In step 1309, a value of the tag is acquired and delivered.

In the step 1310, the "contents classification" is delivered as a tag name while being added with an indication indicative of the personal account title and "standard conversion" is delivered as a value. In this step, the aforementioned end tag is delivered. In step 1311, "conversion object" is delivered as a tag name while being added with an indication indicative of the personal account title and "account title name" is delivered as a value. In this step, the aforementioned end tag is delivered.

In step 1312, "conversion value" is delivered as a tag name while being added with an indication indicative of the personal account title and the personal account title name acquired in the step 1304 is delivered. In this step the aforementioned end tag is delivered. In step 1313, the end tag of parent tags of "account title" tag is delivered.

Figure 14:
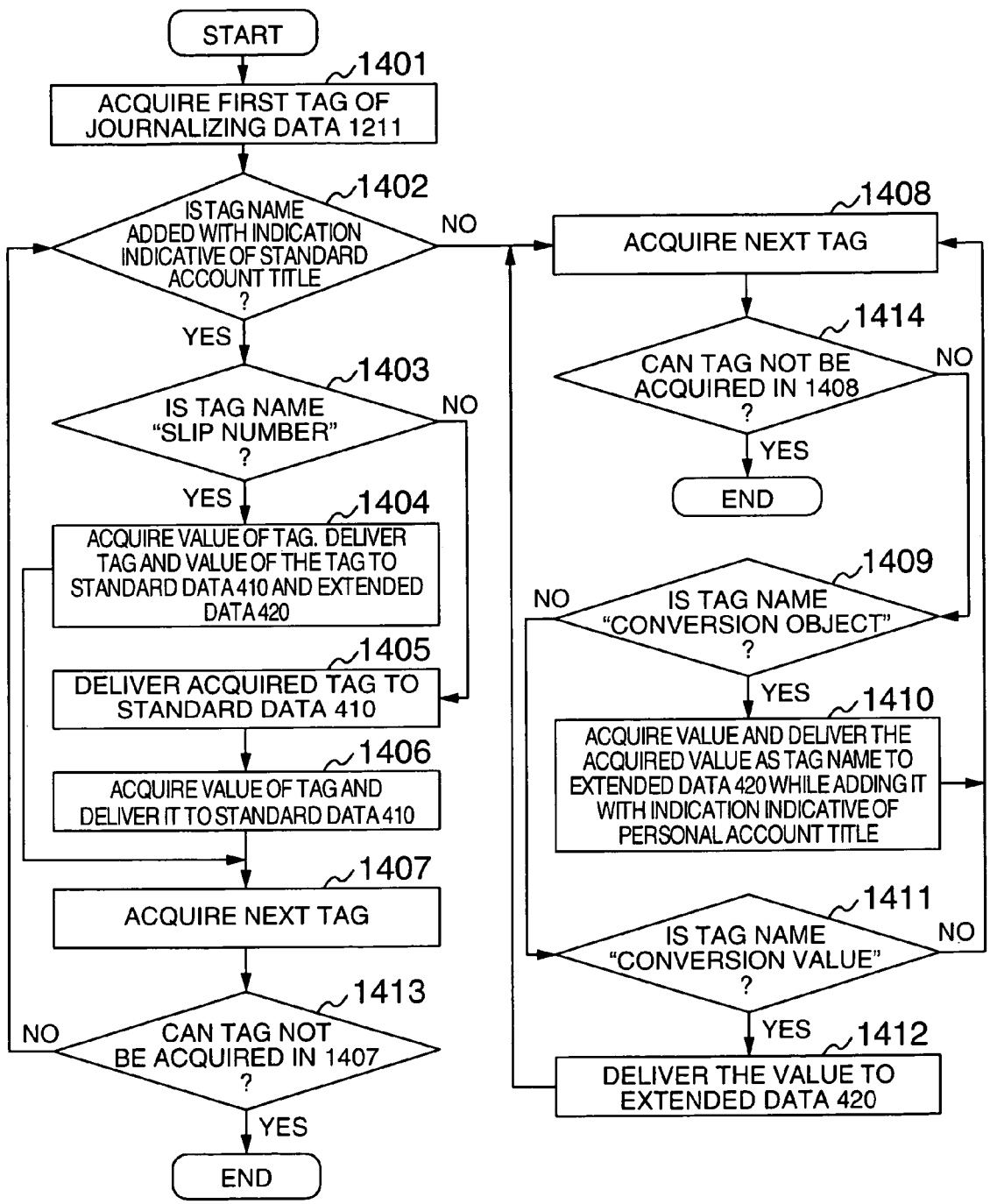
FIG. 14 is a detailed process flowchart of a data separation process in the third embodiment.

Referring to FIG. 14, there is illustrated an example of a detailed process flow in the data separation module. The data separation module 121 carries out a process covering steps 1401 through 1414. In step 1401, a first tag of journalizing data is acquired. In step 1402, it is decided whether the tag name is added with an indication indicative of standard account title and if so, step 1403 is executed but if not so, step 1408 is executed. In the step 1403, it is decided whether the tag name is "slip number" and if so, step 1404 is executed but if not so, step 1405 is executed.

In the step 1404, a value of the tag is acquired and the tag and the tag name are delivered to the standard data 410 and extended data 420. In the step 1405, the acquired tag is delivered to the standard data 410. In step 1406, a value of the tag is acquired and delivered to the standard data 410. In step 1407, the next tag is acquired. In step 1413, it is decided whether the tag cannot be acquired in the step 1407 and if so, the process is ended but if not so, the execution of the step 1402 follows.

In the step 1408, the next tag is acquired. In step 1414, it is decided whether the tag cannot be acquired in the step 1408 and if so, the process is ended but if not so, the execution of step 1409 follows. In the step 1409, it is decided whether the tag name is "conversion object" and if so, step 1410 is executed but if not so, step 1411 is executed.

In the step 1410, a value is acquired and added with an indication indicative of personal account title so as to be delivered as a tag name to the extended data 420. In step 1411, it is decided whether the tag name is "conversion value" and if so, step 1412 is executed but if not so, the execution of the step 1408 follows. In the step 1412, the value is delivered to the extended data 420.

By carrying out the above process, the extended data relevant to the standard data representing a settlement process object can be acquired easily when a consolidated account process is prosecuted in the system having the XBRL receiver 120.

Another method for processing account data will be described in a fourth embodiment.

Figure 15:
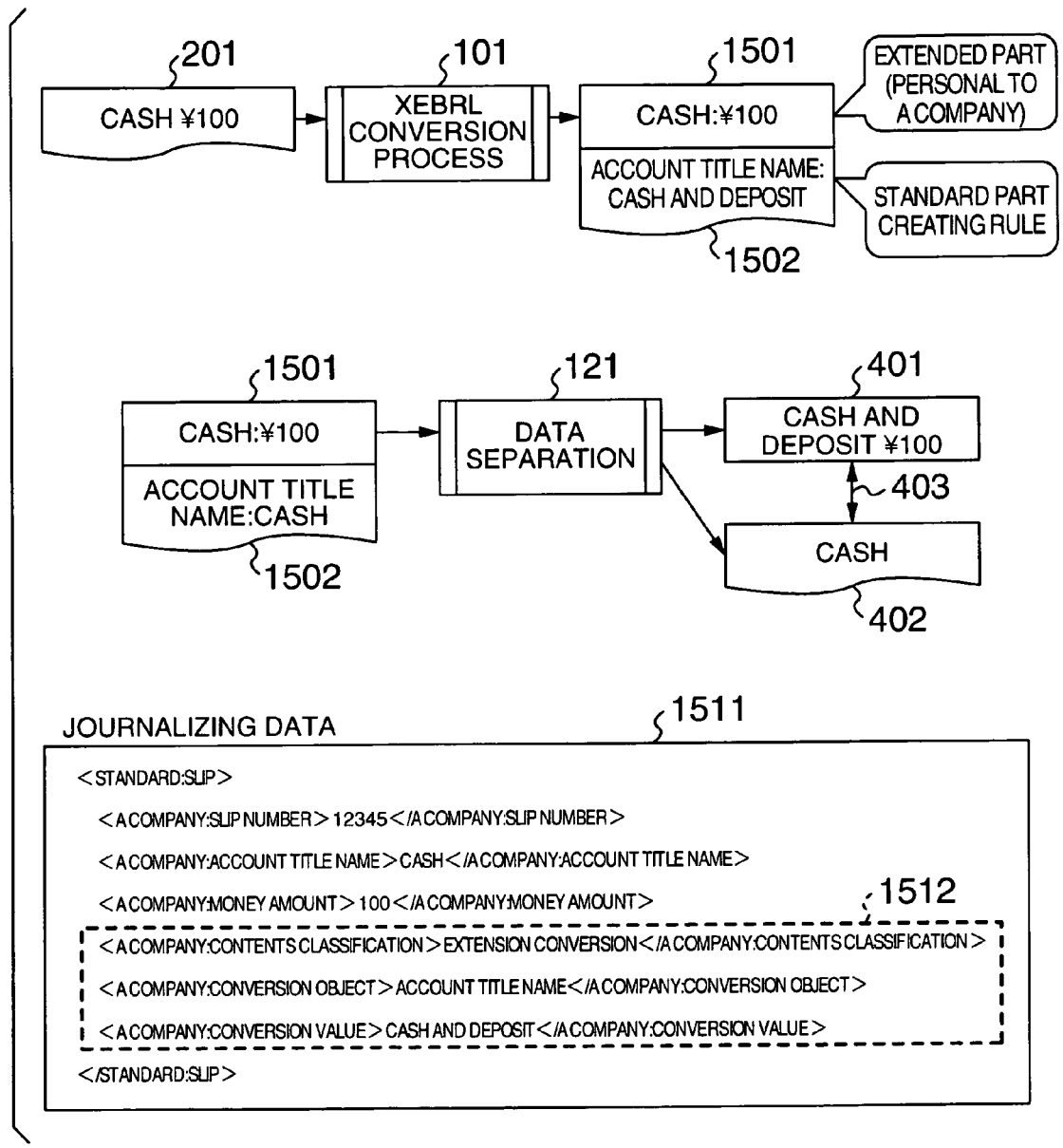
FIG. 15 is a diagram showing a data structure in an account data conversion process in a fourth embodiment.

Referring to FIG. 15, there is illustrated a data structure in another process for conversion of the account data. The XBRL conversion process module 101 receives, as input data, account data 201 having the system inherent data format, converts the received data into account data resulting from synthesis of extended data 1501 and rule information 1502 for preparation of a standard data part and delivers the converted data.

An example of a detailed data structure of the data after conversion is shown at journalizing data 1511. This journalizing data has information 1512 for preparation of the standard data in addition to the extended data in system inherent format. The information 1512 for preparation of the standard data has an identifier indicative of a conversion method, conversion object item information and a value to be changed. The data separation module 121 receiving the data extracts the extended data 402, prepares the standard data 401 described in the XBRL standard format by using the rule information 1502 for preparation and stores the standard data while adding it with relevancy 403. The relevancy referred to herein may be an identifier such as a character or symbol assigned to the standard data and extended data or may be a different means.

Figure 16:
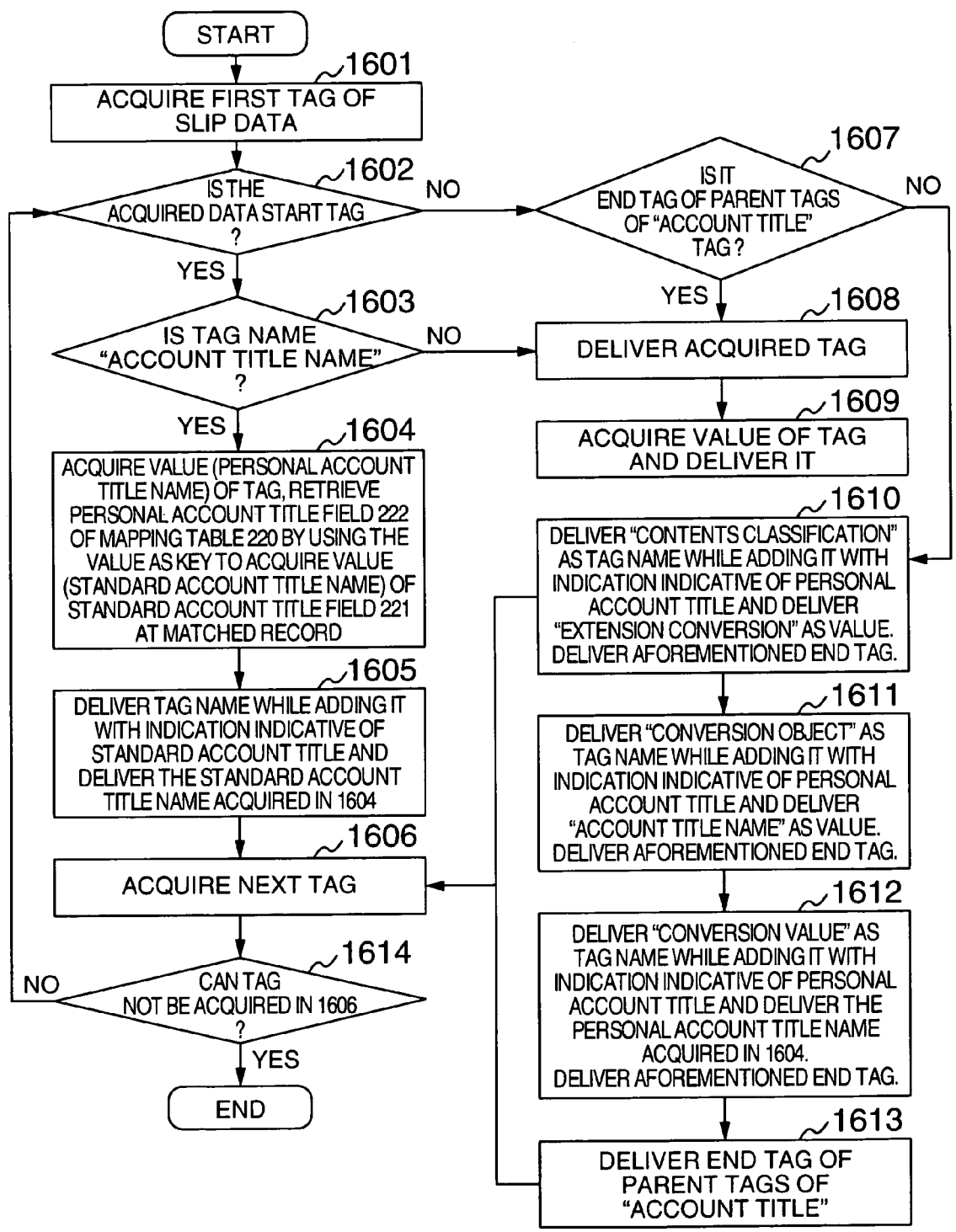
FIG. 16 is a detailed process flowchart of the data conversion process in the fourth embodiment.

Referring to FIG. 16, there is illustrated an example of a detailed process flow in the data conversion process module. The XBRL conversion module 101 carries out a process covering steps 1601 through 1614. In step 1601, a first tag of slip data is acquired. In step 1602, it is decided whether the tag is a start tag and if so, step 1603 is executed but if not so, step 1607 is executed.

In the step 1603, it is decided whether the tag name is "account title name" and if so, step 1604 is executed but if not so, step 1608 is executed. In the step 1604, a value (personal account title name) of the tag is acquired and the personal account title field 222 of mapping table 220 is retrieved using the value as key so that a value (standard account field name) of standard account title field 221 at a coincident record may be acquired.

In step 1605, the tag name is delivered while being added with an indication indicative of the standard account title and the standard account title name acquired in the step 1604 is delivered. In step 1606, the next tag is acquired. In step 1614, it is decided whether the tag cannot be acquired in the step 1606 and if so, the process is ended but if not so, the execution of the step 1602 follows.

In the step 1607, it is decided whether the acquired tag is an end tag of parent tags of "account title" tag and if so, the step 1608 is executed but if not so, step 1610 is executed. In the step 1608, the acquired tag is delivered. In step 1609, a value of the tag is acquired and delivered. In the step 1610, "contents classification" is delivered as a tag name while being added with an indication indicative of the personal account title and "extended conversion" is delivered as a value. In this step, the aforementioned end tag is delivered.

In step 1611, "conversion object" is delivered as a tag name while being added with an indication indicative of the personal account title and "account title name" is delivered as a value. In this step, the aforementioned end tag is delivered.

In step 1612, "conversion value" is delivered as a tag name while being added with an indication indicative of the personal account title and the personal account title name acquired in the step 1604 is delivered. In this step, the aforementioned end tag is delivered. In step 1613, the end tag of parent tags of "account title" tag is delivered.

Figure 17:
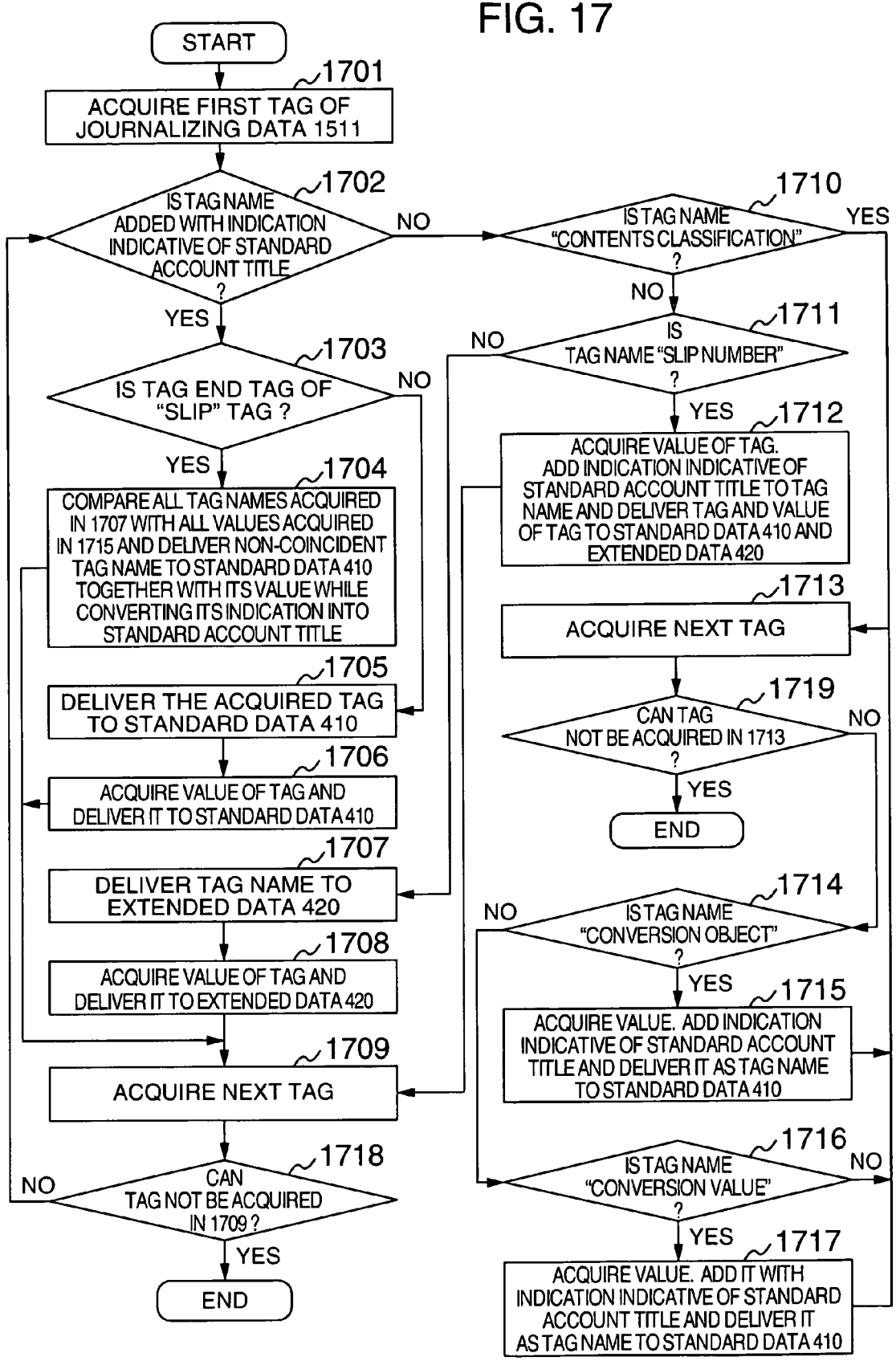
FIG. 17 is a detailed process flowchart of a data separation process in the fourth embodiment.

Referring now to FIG. 17, there is illustrated an example of a detailed process flow in the data separation module. The data separation module 121 carries out a process covering steps 1701 through 1719. In step 1701, a first tag of journalizing data is acquired. In step 1702, it is decided whether the tag name is added with an indication indicative of the standard account title and if so, step 1703 is executed but if not so, step 1710 is executed.

In the step 1703, it is decided whether the tag is an end tag of "slip" tags and if so, step 1704 is executed but if not so, step 1705 is executed. In the step 1704, all tag names acquired in step 1707 are compared with all values acquired in step 1715 and an indication of a non-coincident tag name is converted into the standard account title and the tag name is delivered, together with its value, to the standard data 410.

In the step 1705, the acquired tag is delivered to the standard data 410. In step 1706, a value of the tag is acquired and delivered to the standard data 410. In the step 1707, the tag name is delivered to the extended data 420. In step 1708, a value of the tag is acquired and delivered to the extended data 420. In step 1709, the next tag is acquired.

In step 1718, it is decided whether the tag cannot be acquired in the step 1709 and if so, the process is ended but if not so, the execution of the step 1702 follows. It is decided in the step 1710 whether the tag name is "contents classification" and if so, step 1713 is executed but if not so, step 1711 is executed. In the step 1711, it is decided whether the tag name is "slip number" and if so, step 1712 is executed but if not so, the execution of the step 1707 follows.

In the step 1712, a value of the tag is acquired. In this step, the tag name is added with an indication indicative of the standard account title and the tag and the tag value are delivered to the standard data 410 and extended data 420. In the step 1713, the next tag is acquired. In step 1719, it is decided whether the tag cannot be acquired in the step 1713 and if so, the process is ended but if not so, step 1714 is executed. In the step 1714, it is decided whether the tag name is "conversion object" and if so, the step 1715 is executed but if not so, step 1716 is executed.

In the step 1715, a value is acquired. In this step, the value is added with an indication indicative of the standard account title and delivered as a tag name to the standard data 410. In the step 1716, it is decided whether the tag name is "conversion value" and if so, step 1717 is executed but if not so, the execution of the step 1713 follows. In the step 1717, a value is acquired and delivered as a tag name to the standard data 410 while being added with an indication indicative of the standard account title.

By carrying out the above process, the extended data relevant to the standard data representing a settlement process object can be acquired easily when a consolidated settlement process is prosecuted in the system having the XBRL receiver 120.

Another account data separation processing method will be described in a fifth embodiment.

The system having the XBRL receiver 120 is often constructed independently of the system having the XBRL transmitter 100. In such a case, the XBRL receiver 120 needs to specify a data separation method by deciding whether the received data is data converted according to the third embodiment or data converted according to the fourth embodiment. The data separation module 121 acquires identifiers indicative of conversion methods owned by data separation method describing areas 1212 and 1512 of the received journalizing data 1211 and 1511 and separates data by utilizing the data separation method described in the third or fourth embodiment in accordance with a value of the identifier.

By carrying out the above process, the extended data relevant to the standard data representing a settlement process object can be acquired easily when a consolidated settlement process is prosecuted in the system having the XBRL receiver 120.

By carrying out the above process, inconsistency in data in the consolidated settlement calculation process for intergroup enterprises can be detected automatically and causes of the inconsistency can be specified easily by displaying detailed slip data responsible for the causes.

By carrying out the above process, inconsistency in data can be detected and causes of the data inconsistency can be specified easily by displaying a part relevant to the inconsistent data.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An account data processing method carried out by at least one computer, said account data processing method comprising:

executing operations, via a data conversion unit, of:
acquiring, from a mapping table, standard account data made to correspond to system inherent account data contained in said account data;
converting the inherent account data in said account data into the standard account data; and
adding said inherent account data to said account data, executing operations, via a data separation unit, of:
separating the acquired account data into standard account data and extended account data; and
storing said individual separated account data in a standard data storage table and an extended data storage table, respectively, by adding a same data identifier to said individual separated account data to make correspondence relationships therebetween, and executing an operation, via a data totaling unit, of:
acquiring a plurality of pieces of standard account data having an account title name from said standard data storage table, each of the account title name being the same with each other, and synthesizing the acquired plurality of pieces to total data, executing an operation, via a financial data preparing unit, of:
preparing financial data from said total data in accordance with standard account data defining data, executing an operation, via a financial data displaying unit, of displaying said financial data, executing operations, via a consolidated settlement consistency verifying unit, of:

acquiring, from a verification item correspondence list, a collation target item relevant to a collation source item contained in said financial data;

acquiring a value of said collation target item contained in verification object financial data of said financial data;

comparing a value of said collation source item with the value of said collation target item; and calling a financial data comparing unit when non-coincidence occurs, executing operations, via said financial data comparing unit, of:

acquiring, from a total data storage table, total data corresponding to said collation source item and total data corresponding to a collation target account title;

comparing corresponding standard account data contained in each of the total data; and calling an inconsistent data displaying unit when non-coincidence occurs, and executing operations, via said inconsistent data displaying unit, of:

acquiring, from said extended data storage table, respective extended account data described in a format of inherent account data corresponding to said standard account data; and displaying the acquired data.

2. The account data processing method according to claim 1, wherein:

the operation of converting inherent account data contained in said account data into standard account data via said data conversion unit includes an operation of:

adding an identifier indicative of the standard account data to tag information, the operation of adding said inherent account data to said account data via said data conversion unit, includes an operation of:

adding an identifier indicative of the inherent account data to tag information, and the operation of separating the acquired account data into the standard account data and extended account data via said data separation unit includes an operation of:

performing the data separation by identifying said identifiers.

3. The account data processing method according to claim 1, comprising:

executing operations, via said data conversion unit, of:

acquiring, from said mapping table, standard account data made to correspond to system inherent account data contained in said account data, and converting the inherent account data in said account data into standard account data and adding information indicative of converted inherent account data item and said inherent account data to said account data; and executing an operation, via said data separation unit, of:

extracting standard account data from received account data and preparing extended account data from said information of converted item and said inherent account data.

4. The account data processing method according to claim 3, wherein:

the operation of converting the inherent account data in account data into standard account data via said data conversion unit includes an operation of:

adding an identifier indicative of the standard account data to tag information, and the operation of adding the information of converted item and said inherent account data to said account data via said data conversion unit, includes an operation of:

adding, to tag information, an identifier informing said additional information of the converted information, and the operation of extracting standard account data from received account data and generating extended account data from said information of converted item and said inherent account data, via said data separation unit, includes an operation of:

separating the data by identifying said identifier.

5. The account data processing method according to claim 1, comprising:

executing operations, via said data conversion means, of:

acquiring, from said mapping table, standard account data corresponding to system inherent account data contained in said account data, and adding the acquired standard account data to said account data together with information of corresponding standard account data item, and executing operations, via said data separation unit, of:

extracting extended account data from received account data, and generating standard account data from said information of corresponding standard account data item and said standard account data.

6. The account data processing method according to claim 5, wherein:

the operation of adding the standard account data made to correspond to system inherent account data contained in the account data and the information of corresponding item to said account data, via said data conversion unit, includes operations of:

adding, to tag information, an identifier informing the system inherent account data of the inherent account data, and adding, to tag information, an identifier informing the information of corresponding item of the conversion information, and the operation of extracting extended account data from received account data and generating standard account data from said information of corresponding item and said standard account data, includes an operation of:

separating the data by identifying said identifiers.

7. A system in which an input terminal is adapted to transmit inputted account data to a data process interface, said interface is adapted to transmit said data to a data transmitter, said data transmitter is adapted to transmit said data to a data receiver through a network and said data receiver is adapted to receive said data to perform a business affairs process, wherein said data transmitter includes a data conversion unit and a mapping table, and wherein said data receiver includes a data separation unit, a standard data storage table and an extended data storage table, said system further including data totaling unit, financial data preparing unit, financial data displaying unit, consolidated settlement consistency verifying unit, financial data comparison unit, inconsistent data displaying unit, standard account data defining data, a verification item correspondence list, and a total data storage table for storing total data, wherein in said system:

said data conversion unit is adapted to execute operations of:

acquiring, from said mapping table, standard account data made to correspond to system inherent account data contained in said account data;

converting the inherent account data in said account data into the standard account data; and adding said inherent account data to said account data, said data separation unit is adapted to execute operations of:

separating the acquired account data into standard account data and extended account data; and storing said individual separated account data in said standard data storage table and said extended data storage table, respectively, by adding a same data identifier to said individual separated account data to make correspondence relationships therebetween, and said data totaling unit is adapted to execute operations of:

acquiring a plurality of pieces of standard account data having an account title name from said standard data storage table, each of the account title name being the same with each other, and synthesizing the acquired plurality of pieces to total data, said financial data preparing unit is adapted to execute operations of:

preparing financial data from said total data in accordance with the standard account data defining data, said financial data displaying unit is adapted to execute operations of:

displaying said financial data, said consolidated settlement consistency verifying unit is adapted to execute operations of:

acquiring, from said verification item correspondence list, a collation target item relevant to a collation source item contained in said financial data;

acquiring a value of said collation target item contained in verification object financial data of said financial data;

comparing a value of said collation source item with the value of said collation target item; and calling said financial data comparing unit when non-coincidence occurs, said financial data comparing unit is adapted to execute operations of:

acquiring, from said total data storage table, total data corresponding to said collation source item and total data corresponding to said collation target account title;

comparing corresponding standard account data contained in each of the total data; and calling said inconsistent data displaying unit when non-coincidence occurs, and said inconsistent data displaying unit is adapted to execute operations of:

acquiring, from said extended data storage table, respective extended account data described in a format of inherent account data corresponding to said standard account data; and displaying the acquired data;

wherein at least one of said data conversion unit, said data separation unit, said data totaling unit, said financial data preparing unit, said financial data displaying unit, said consolidated settlement consistency verifying unit, said financial data comparing unit, and said inconsistent data displaying unit, is carried out by at least one computer.

* * * * *